United States Patent [19]

Kusaka et al.

[11] Patent Number: 4,907,784
[45] Date of Patent: Mar. 13, 1990

[54] APPARATUS FOR SUCCESSIVELY FUSING SMALL PARTICLES OF NONFERROUS METAL

[75] Inventors: Kazuo Kusaka; Shigeo Suehiro; Noboru Tajiri; Kiyoshi Nakamura, all of Hiroshima; Tsuyoshi Okimoto, Aichi, all of Japan

[73] Assignees: Sanken Sangyo Kabushiki Kaisha, Hiroshima; Aishin Seiki Kabushiki Kaisha, Kariya, both of Japan

[21] Appl. No.: 272,116

[22] Filed: Nov. 16, 1988

[30] Foreign Application Priority Data

Nov. 17, 1987 [JP] Japan ................. 62-291607

[51] Int. Cl.⁴ .................................. C22B 9/16
[52] U.S. Cl. ............................ 266/235; 266/233; 266/901
[58] Field of Search ............ 266/200, 233, 235, 900, 266/901

[56] References Cited

U.S. PATENT DOCUMENTS

| 2,873,102 | 2/1959 | Tripmacher et al. | 266/233 |
| 3,272,619 | 9/1966 | Sweeney et al. | 266/200 |
| 4,386,764 | 6/1983 | Claxton | 266/235 |
| 4,518,424 | 5/1985 | Ormesher | 266/235 |
| 4,598,899 | 7/1986 | Cooper | 266/235 |

OTHER PUBLICATIONS

Extract of "Present and Future in Fusing of Cut Powder of Aluminum", by Zenjyu Tsumura, published Jun. 1986, pp. 9–13.

*Primary Examiner*—S. Kastler
*Attorney, Agent, or Firm*—Flynn, Thiel, Boutell & Tanis

[57] ABSTRACT

An apparatus for fusing small articles of nonferrous metal comprises an molten metal chamber, for forming and containing molten metal, having burners for fusing a raw material such as ingot etc., and a fusing chamber disposed adjacent to the molten metal chamber for fusing small particles of the nonferrous metal. The molten metal discharged from the molten metal chamber is circulated through a swirl generation chamber and a suction passage and is introduced into a pump and discharged into to the molten metal chamber. The small particles of nonferrous metal are introduced into the upper side of a swirl generation chamber, in which a swirl stream is generated, mixed with the molten metal while dispersed in the molten metal and delivered to the molten metal chamber.

8 Claims, 2 Drawing Sheets

APPARATUS FOR SUCCESSIVELY FUSING SMALL PARTICLES OF NONFERROUS METAL

BACKGROUND OF THE INVENTION

1. Field of the Invention

The present invention relates to an apparatus for successively fusing small particles of cut powder of nonferrous metal such as aluminum or aluminium alloy etc., which are generated when they are subjected to a mechanical process. The resultant molten metal is reutilized in the field.

2. Description of the Prior Art

A first example of a prior apparatus for successfully fusing an aluminium cut powder is a molten metal pouring fusing apparatus. According to the molten metal pouring fusing apparatus, a cut powder is first inserted into a pan having a plurality of apertures at the bottom thereof, then the molten metal pumped up by a pump is poured over the pan having the cut powder therein. However, the first prior apparatus has a problem in that when the molten metal pumped up by the pump is poured over the cut powder, the molten metal is likely to come in contact with the atmosphere so that the molten metal is oxidized by the atmosphere which results in a bad yield rate thereof and a low thermal efficiency.

A second example of a prior apparatus for successfully fusing an aluminium cut powder has a burner disposed at one side of a cylindrical rotary furnace, and an exhaust gas outlet at the other end thereof, in which a fusing flux to be melted for the prevention of oxidization is first inserted into the apparatus, then the aluminium cut powder is inserted into the apparatus after the fusing flux to be melted is melted, and finally, the cut powder is melted while it is covered by the molten flux. However, the second example of a prior apparatus has a problem in that since the molten flux is costly, the apparatus is expensive as a whole although there is an advantage that the molten flux and the cut powder can be efficiently stirred by the rotation of the rotary burner with high thermal transmission efficiency.

A third example of a prior apparatus for successfully fusing an aluminium cut powder comprises a tapered swirl generation chamber having openings at an upper and a lower end thereof and a rotary fan provided near the lower end of the swirl generation chamber, in which a swirl stream of a molten metal is first formed in the swirl generation chamber, then a cut powder supplied from an upper portion is swallowed into the swirl stream of the molten metal, and finally the cut powder is melted. However, the third example of the prior apparatus has a problem in that the rotary fan is likely to be damaged since it contacts with the cut powder under high temperatures.

A fourth example of a prior apparatus for successfully fusing an aluminium cut powder comprises a vertical enclosure having a frustoconical inner peripheral surface provided on an upper surface of a molten metal which flows horizontally, and a stirring fan provided at an upper side adjacent to the surface of the molten metal for pushing the cut powder supplied to the vertical enclosure into the molten metal so that the cut powder can be melted. However, the fourth example of a prior apparatus has a problem in that the molten metal is likely to be oxidized by heat received from the molten metal since the aluminium cut powder may be accumulated at a height higher than the surface of the molten metal and kept in the molten metal for a while although there is an advantage that the stirring fan can not be damaged since it does not contact with the high temperature molten metal which results in assuring a long life of the apparatus.

SUMMARY OF THE INVENTION

It is an object of the present invention to provide an apparatus for successively fusing small particles of nonferrous metal that is capable of preventing small particles of the nonferrous metal and molten metal thereof from contacting with air to thereby be oxidized so that the yield rate thereof can be increased.

It is a second object of the present invention to provide an apparatus for successively fusing small particles of nonferrous metal that is capable of preventing a movable part, such as a rotary fan, from contacting with the cut powder to thereby eliminate damage caused by shock when the movable part contacts with the cut powder, and thereby is capable of assuring the long life of the apparatus.

To achieve the objects of the present invention, the present invention provides an apparatus for successfully fusing small particles of nonferrous metal comprising a molten metal chamber for retaining a raw material of metal which was subjected to heating and fusing treatment; a fusing chamber for fusing small particles of nonferrous metal introduced into the high temperature molten metal; a pump provided in the fusing chamber for circulating the molten metal between the molten metal chamber and the fusing chamber; and a cylindrical swirl generation chamber provided in the fusing chamber opposite and at a suction side of the pump, the swirl generation chamber having a circular inner peripheral wall, an introduction passage extending tangentially to a side surface thereof and a discharge port of circular cross section opened to substantially the middle portion of the bottom surface thereof.

The molten metal is introduced through the side surface of the swirl generation chamber into the interior of the swirl chamber and is discharged downward from the bottom surface of the swirl chamber. With such an arrangement of the swirl chamber, a swirl stream of the molten metal is generated in the swirl chamber, and the cut powder of the nonferrous metal supplied into the central portion of the swirl chamber is swallowed into the swirl stream, dispersed immediately into the molten metal and melted therein.

Accordingly, the small particles of nonferrous metal and the molten metal are restricted from contacting with air while the small particles are subjected to a fusing treatment so that the yield rate thereof is increased.

The above and other objects, features and advantages of the present invention will become more apparent from the following description taken in conjunction with the accompanying drawings.

PREFERRED EMBODIMENT OF THE PRESENT INVENTION

Figure 1:
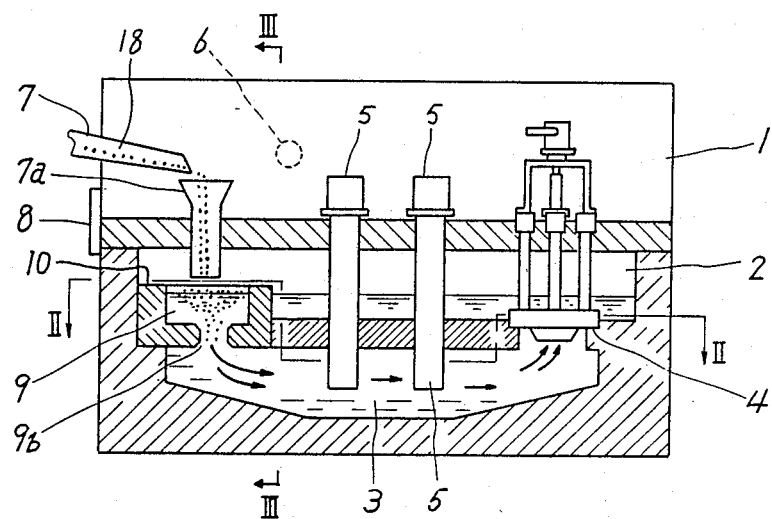
FIG. 1 is a vertical cross sectional front view of an apparatus for successively fusing small particles of nonferrous metal, according to an embodiment of the present invention.
Figure 2:
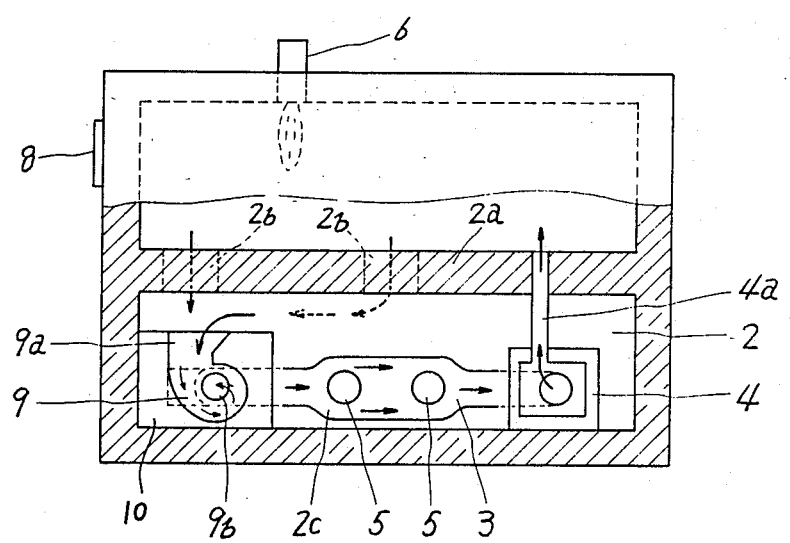
FIG. 2 is a view taken along II—II of FIG. 1.
Figure 3:
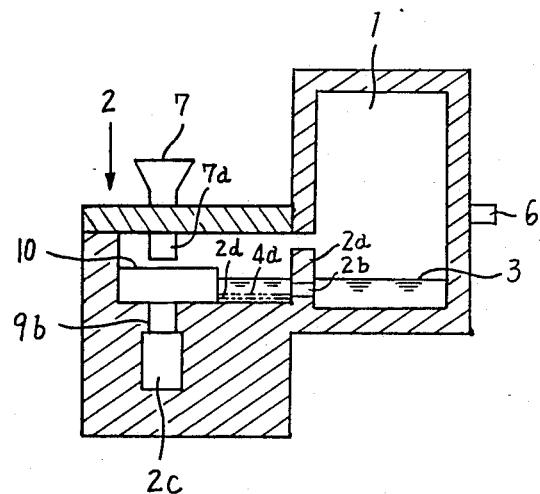
FIG. 3 is a view taken along III—III of FIG. 1.

An apparatus for fusing small particles of nonferrous metal will be described with reference to FIGS. 1 through 4.

A molten metal chamber 1 for fusing a raw material such as ingots, etc., and retaining the fused material inside thereof as a molten metal, stores the molten metal 3 at the lower end thereof. The molten metal chamber 1 is provided with a door 8 at a lower part of a side wall thereof for inserting raw material thereinto and taking out molten metal therefrom and burners 6 at a rear wall thereof for heating and fusing the raw material and keeping the metal molten. The molten metal chamber 1 further includes a dam 2a at a lower part of a front side thereof. At the front side of the dam 2a, a molten metal tank 2d of a fusing chamber 2 is provided adjacent the molten metal chamber 1.

The height of the ceiling of the fusing chamber 2 is lower than that of the molten metal chamber 1 and the height of the bottom surface of the molten metal chamber 1 is the same as that of the bottom surface of the molten metal tank 2d of the fusing chamber 2. There is provided apertures 2b in the dam 2a for communication between the molten metal chamber 1 and the molten metal tank 2d, normally at a position under the surface of molten metal. At an end of the molten metal tank 2d there is provided a projection part 10 slightly extending above the surface of the molten metal. A swirl generation chamber 9 having a circular inner peripheral wall is provided or recessed in the projection part 10. An introduction passage 9a communicating with the molten metal tank 2d is provided at a peripheral wall of the swirl generation chamber 9 in a direction extending tangentially to a side surface of the swirl generation chamber 9. Assuming that a shape composed of the swirl generation chamber 9 and the introduction passage 9a extending tangentially to the side surface of the swirl generation chamber 9 is an approximate involute curve, an discharge port 9b for discharging the molten metal from the swirl generation chamber 9 is provided downward at the central portion of the involute curve. The molten metal tank 2d has a stirring pump 4 at the other end thereof and a suction passage 2c at a lower side of the bottom surface thereof communicating with the discharge port 9b and a suction part provided at the lower surface of the pump 4. Immersion burners 5 are inserted into the suction passage 2c from the upper portion of the suction passage 2c and fixed therein.

Figure 4:
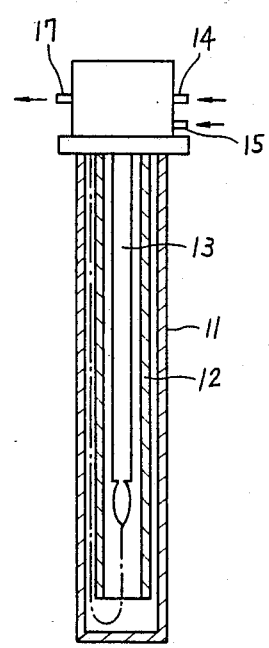
FIG. 4 is a vertical cross sectional enlarged side view of an immersion burner employed in the apparatus as illustrated in FIG. 1.

The immersion burners 5 comprise, as shown in FIG. 4, a heat resistant outer cylinder 11 having a bottom, a heat resistant inner cylinder 12 having no bottom, a burner 13 disposed inside the heat resistant inner cylinder 12, and an upper portion having an air inlet pipe 14 and a fuel pipe 15. The burner 13 is ignited by air supplied from the air pipe 14 and fuel supplied from the fuel pipe 15 to generate a combustion gas 16. The combustion gas 16 is first contained inside the inner cylinder 12, then rises through the space between the inner and outer cylinders 11, 12, and finally exhausted outside through an exhaust pipe 17. The pump 4 communicates with the molten metal chamber 1 at an outlet thereof through a delivery pipe 4a which penetrates molten metal tank 2d. At an upper portion of the swirl generation chamber 9 of the fusing chamber 2, there is provided a delivering device 7 for introducing small nonferrous particles into the swirl generation chamber 9. An outlet of the delivering device 7 is connected to the swirl generation chamber 9 via a heat resistant delivering guide 7a.

With such an arrangement of the apparatus for successively fusing small articles of nonferrous metal, an operation thereof will be described herewith.

First, the door 8 of the molten metal chamber 1 is opened to insert the raw material, such as an ingot, into the molten metal chamber 1. The ingot is heated by the burners 6 and fused to form the molten metal 3.

Then, the pump 4 is actuated to thereby allow the molten metal 3 to circulate through the molten metal chamber 1, the apertures 2b, the molten metal tank 2d, the swirl generation chamber 9, the suction passage 2c, the pump 4, the delivering pipe 4a and return to the molten metal chamber 1. During circulation, the molten metal 3 is introduced into the swirl generation chamber 9 from the introduction passage 9a through the side surface of the swirl generation chamber 9 tangentially thereto and discharged from the discharge port 9b whereby a swirl stream of the molten metal 3 is generated inside the swirl generation chamber 9.

Small particles of nonferrous metal 18 are delivered by the delivering device 7 through the delivering guide 7a into the swirl generation chamber 9. The thus delivered small particles of nonferrous metal are swallowed into the swirl stream of the molten metal 3, dispersed immediately into the high temperature molten metal 3 and melted by the heat of the molten metal 3. The small particles of nonferrous metal and the molten metal 3 thereof contact with air under a high temperature for a very short period of time so that they will not be oxidized and thereby increases the yield rate thereof.

The molten nonferrous metal is accompanied by the molten metal 3 and supplied to the molten metal chamber 1 through the suction passage 2c surrounding the immersion burners 5, the pump 4 and the delivering pipe 4a.

The immersion burners 5 are provided for increasing the temperature of the molten metal 3 because the temperature of the molten metal 3 is lowered due to the absorption of heat by the small particles of nonferrous metal, and for warming the molten metal 3 remained in the suction passage 2c when the pump 4 is stopped. The number of immersion burners 5 provided is dependent on the capability of fusing the cut powder of the small particles and the condition of use of the apparatus.

According to the present invention, a swirl stream can be generated in a swirl generation chamber 9 of a very simple structure by provision of a cylindrical swirl generation chamber 9 of circular cross section at the suction side of the pump 4 in the fusing chamber 2, an introduction passage 9a extending tangentially to the side surface thereof and a discharge port 9b of circular cross section provided at the middle portion of the bottom surface of the swirl generation chamber 9. Inasmuch as the small particles of nonferrous metal 18 supplied from the upper portion of the swirl stream are swallowed into the swirl stream, dispersed immediately and melted, the small particles and the molten metal contact with air for a very short period of time so that they are scarcely oxidized and a high yield rate thereof can be maintained.

In addition to the advantages set forth above, inasmuch as a movable part such as a rotary fan is not provided in the swirl generation chamber 9, the damage caused by the shock of friction between the movable part and the small particles of nonferrous metal is eliminated to remarkably prolong the life of the apparatus.

The present apparatus can be employed in the fusing of different kinds of nonferrous metals, such a when silicon or magnesium etc., are added to an aluminium molten metal, to produce an alloy having a uniform composition thereof with ease.

Although the invention has been described in its preferred form with a certain degree of particularity, it is to be understood that many variations and changes are possible in the invention without departing from the scope thereof.

What is claimed is:

1. An apparatus for fusing small particles of nonferrous metal comprising:
    a molten metal chamber for containing a molten metal formed from a metal raw material which was subjected to heating and fusing treatment;
    a fusing chamber for fusing small particles of nonferrous metals by introduction of the particles into a high temperature molten metal;
    a molten metal tank contained within said fusing chamber and provided adjacent to said molten metal chamber;
    a pump provided in the fusing chamber for circulating molten metal between the molten metal chamber and the fusing chamber;
    a delivery pipe connecting an outlet port of the pump with the molten metal chamber by penetrating the molten metal tank; and
    a cylindrical swirl generation chamber provided in the fusing chamber at a suction side of the pump, said swirl generation chamber having a circular inner peripheral wall, an introduction passage extending tangentially to a side surface thereof and a discharge port of circular cross section provided substantially at the middle of a bottom surface thereof.

2. An apparatus for fusing small particles of nonferrous metal according to claim 1, further including a dam provided between the molten metal chamber and the fusing chamber, the dam having apertures therein communicating between the molten metal chamber and the fusing chamber.

3. An apparatus for fusing small particles of nonferrous metal according to claim 1, wherein a center of the discharge port of the swirl generation chamber is positioned at a center of an involute curve assuming that a shape composed of the cylindrical swirl generation chamber and the introduction passage forms said involute curve.

4. An apparatus for fusing small particles of nonferrous metal according to claim 1, wherein a suction passage is provided and communicates between the discharge port of the swirl generation chamber and a suction port of the pump, the suction passage being located under the bottom surface of the molten metal tank.

5. An apparatus for fusing small particles of nonferrous metal according to claim 1, wherein a projection part is provided at an end of the molten metal tank and said swirl generation chamber is provided in the projection part.

6. An apparatus for fusing small particles of nonferrous metal according to claim 2, wherein a projection part is provided at the end of the molten metal tank and said swirl generation chamber is provided in the projection part.

7. An apparatus for fusing small particles of nonferrous metal according to claim 1, wherein immersion burners are provided in a suction passage connecting the discharge port of the swirl generation chamber with a suction port of the pump.

8. An apparatus for fusing small particles of nonferrous metal according to claim 4, wherein immersion burners are provided in the suction passage.

* * * * *